I. F. AVERY.
DUMPING VEHICLE OR THE LIKE.
APPLICATION FILED JAN. 19, 1918.

1,365,810.

Patented Jan. 18, 1921.
4 SHEETS—SHEET 1.

Witnesses:

Inventor.
Irving F. Avery

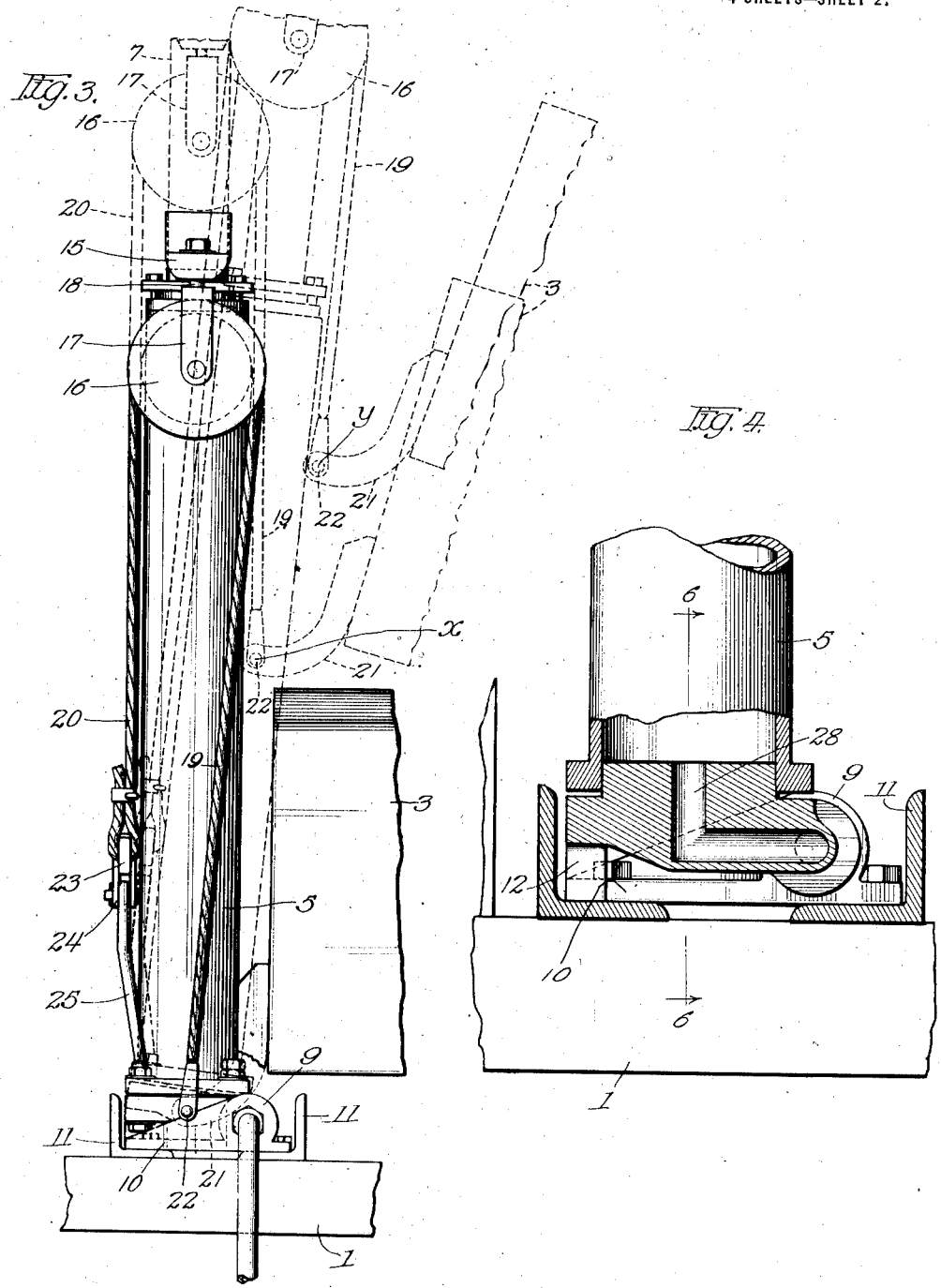

I. F. AVERY.
DUMPING VEHICLE OR THE LIKE.
APPLICATION FILED JAN. 19, 1918.

1,365,810.

Patented Jan. 18, 1921.
4 SHEETS—SHEET 3.

I. F. AVERY.
DUMPING VEHICLE OR THE LIKE.
APPLICATION FILED JAN. 19, 1918.
1,365,810.
Patented Jan. 18, 1921.
4 SHEETS—SHEET 4.
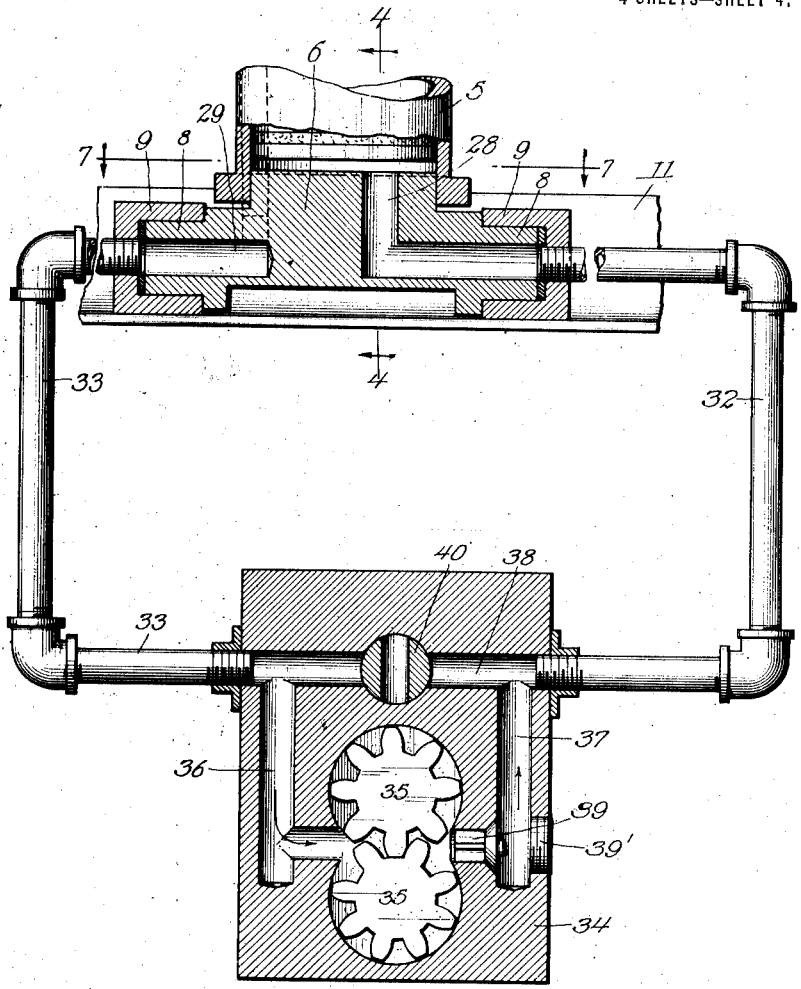
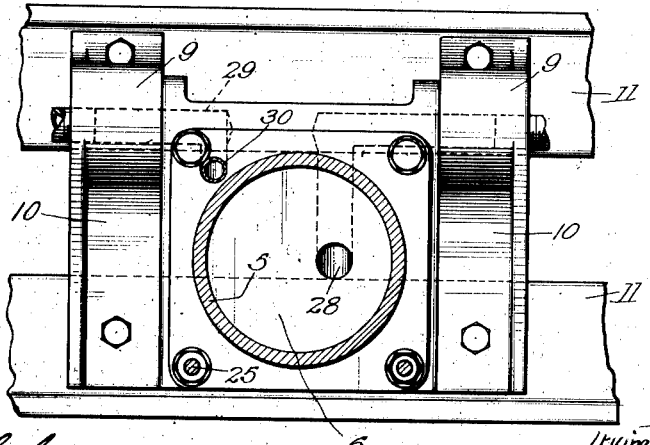
Witnesses:
Inventor:
Irving F. Avery

UNITED STATES PATENT OFFICE.

IRVING F. AVERY, OF CHICAGO, ILLINOIS, ASSIGNOR TO JACOB H. PRESS, OF CHICAGO, ILLINOIS.

DUMPING-VEHICLE OR THE LIKE.

1,365,810.  Specification of Letters Patent.  Patented Jan. 18, 1921.

Application filed January 19, 1918. Serial No. 212,642.

*To all whom it may concern:*

Be it known that I, IRVING F. AVERY, a citizen of the United States, residing at Chicago, in the county of Cook and State of Illinois, have invented certain new and useful Improvements in Dumping-Vehicles or the like, of which the following is a description.

My invention belongs to that general class of devices known as dump vehicles and relates particularly to a wagon, truck or other vehicle having a body arranged to be tilted or elevated so as to discharge a load at a desired point, in a minimum time and with a minimum of labor. The invention more particularly relates to an improved hoisting mechanism for tilting the body or lowering it back to carrying position. The invention has among its objects the production of a device of the kind described that is simple, convenient, durable, compact, efficient and satisfactory that may be used wherever found applicable. More especially it relates to dumping mechanism particularly suitable for use in heavy automobile trucks and is in the nature of an improvement over the devices shown in my pending application filed December 27, 1915, Serial Number 68,769. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts.

Fig. 3 is a side elevation of the hoisting mechanism;

Fig. 4 is a sectional view taken substantially on line 4—4 of Fig. 6;

Fig. 6 is a sectional view taken on line 6—6 of Fig. 4 of the casing and illustrating the pump and controlling mechanism in connection with the same; and Fig. 7 is a sectional view taken substantially on line 7—7 of Fig. 6.

Figure 1:
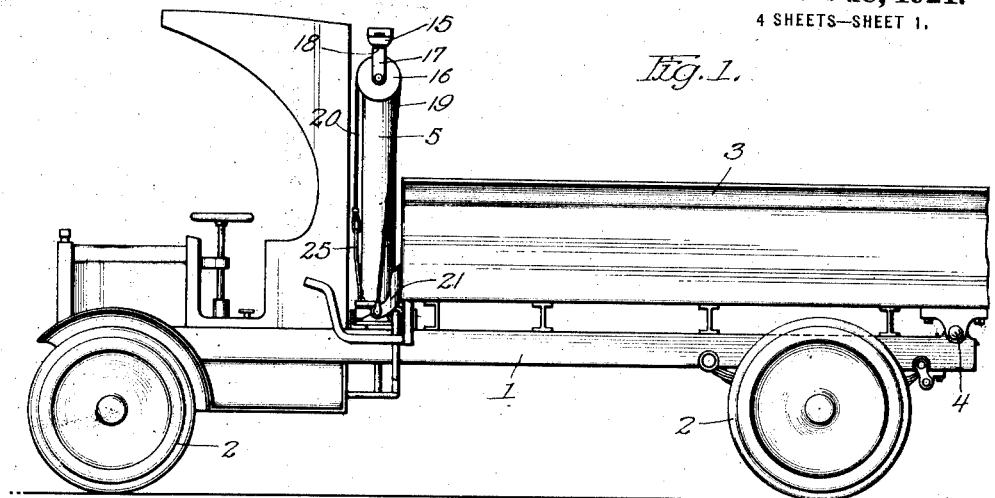
Figure 1 is a side elevation of a truck equipped with my apparatus.
Figure 2:
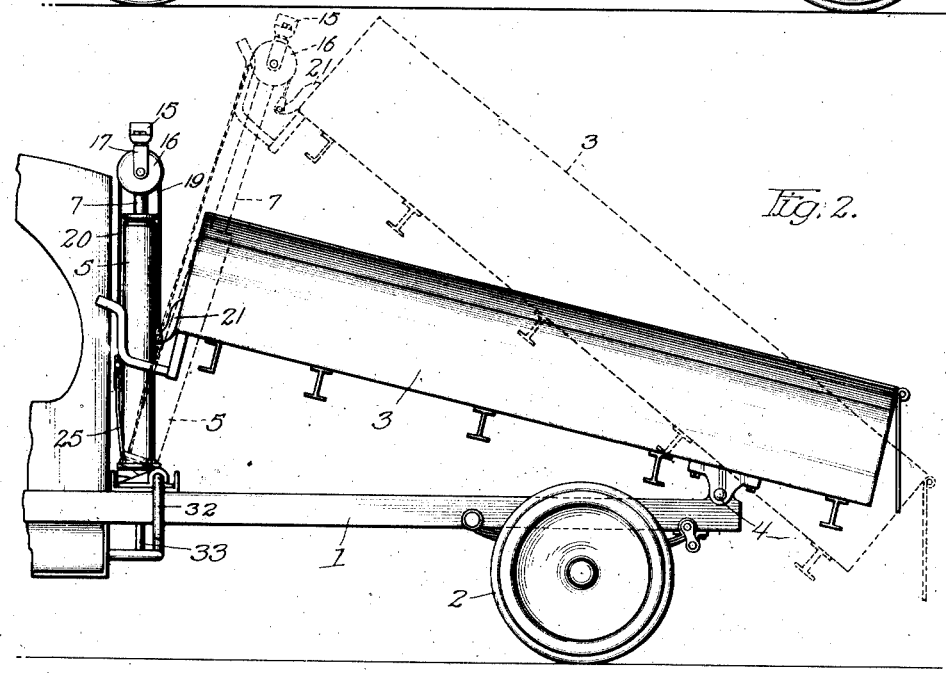
Fig. 2 is a similar view of a portion of the same, the body in raised position.

Referring to the drawings, 1 represents the wagon or truck frame carried by the wheels 2 or equivalents, 3 being a tiltable body of any desired design which is suitably mounted on the frame 1. As shown, the body 3 is pivotally secured and supported on the frame at 4, the front end in the truck illustrated being adapted to be raised or tilted so as to discharge the contents of the body at the rear. My hoisting or elevating mechanism consists of a casing 5 of suitable size and shape, from which projects a plunger rod 7, the piston or plunger not being shown. It may be mentioned that the plunger is moved in the casing 5 by pumping a suitable fluid, for example oil, into the casing below the plunger, the plunger being permitted to return under the weight of the body by permitting the contained fluid below the plunger to escape from the casing. The casing 5 is tiltably or adjustably mounted on the frame 1 so that the same may be tilted after the front of the body is elevated to a desired point so that there is no side or transverse strain on the hoisting mechanism when the body is in elevated position as would be the case if the casing 5 were rigidly mounted on the frame. As shown, the casing is provided with a suitable base 6 having trunnions 8 carried on bearings 9 secured to the cross supports 11, which are carried on the frame 1. As shown, the bearings 9 are each preferably formed with an extending plate or base 10, so as to bridge the cross supports 11, which preferably extend across the frame, one in front and one in back of the casing. A stop and casing support 12 is arranged at the front of the casing to support the front side when the same is down.

Figure 5:
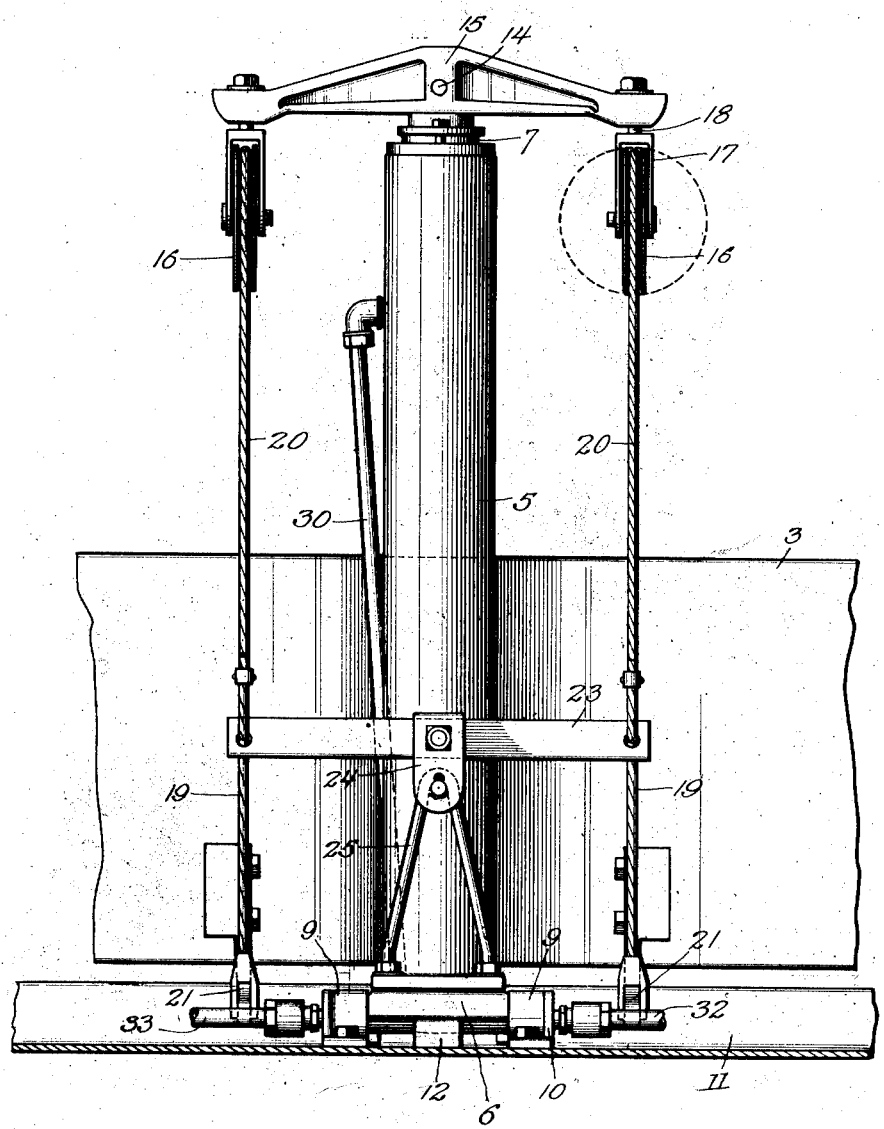
Fig. 5 is a front elevation of the hoisting mechanism.

At the upper end of the plunger rod 7 I provide a cross head 15, which carries one or more sheaves 16. I prefer two sheaves 16, one at each side of the casing 5. The sheaves 16 are adjustably secured to the cross head 15 by means of the shackles 17 which are provided with bolts 18 arranged to pivotally secure the shackles 17 to the head, one adjacent each end. The advantage of the swivel or pivotal connection is that it avoids twisting strain on the cross head and also permits the sheaves 16 to be arranged as shown or turned at an angle, as for example as indicated in dotted lines in Fig. 5. In some cases it is desirable to so arrange the sheaves at some other angle, depending upon the particular design of the hoist or body. Arranged over each sheave is a cable, one end 19 being connected at 22 to a bracket 21 secured adjacent the front end of the body. The other end 20 of each is secured to an equalizer or cross bar 23 and this is connected by means of the shackle 24 or the equivalent by the bolt or bar 25 to the base of the hoist. Obviously, if the bar 15 is pivoted at 14 to the plunger rod, the equalizing bar 23 may be omitted. It will be particularly noted by referring to Figs. 1, 2, 3 and 7 that the trunnions 8 are not arranged at the center of the hoist but at one side (as shown, toward the rear) and that the bracket 21 has its end extended forward so that the pivotal connection at 22 is forward of the trunnions 8 at each side of the hoist. The reason for this will be more fully explained hereafter, as well as the possible variations of the same.

As was before mentioned, the hoist illustrated is known as an hydraulic hoist, in which a suitable fluid, preferably oil, is pumped into the casing below the plunger or allowed to escape therefrom to control the operation of the hoist, to-wit, elevating or lowering of the body. The hoist being tiltable, I prefer to make the trunnions 8 tubular and provide the base of the casing with the ducts 28—29, duct 28 extending to the interior of the bottom of the casing below the plunger and duct 29 being preferably connected by a pipe 30 or its equivalent to a point adjacent the upper part of the casing. To the tubular trunnions I connect pipes 32 and 33 which are connected with suitable pumping mechanism. I have illustrated pumping mechanism constructed in two ways which to all intents and purposes are similar, the only difference being that in one piping is arranged at the exterior of the pump casing, while in the other the pump casing is formed with ducts therein corresponding to the piping. Referring to Fig. 6, 34 represents a pump casing, a gear pump being preferably employed consisting of the gears 35 arranged to be driven from the truck engine or an independent source of power as the case may be. The particular driving power for the pump is immaterial in so far as the present invention is concerned. To the casing 34 are connected pipes 32 and 33. Ducts 36 and 37 are provided in the casing 34, and the duct 38 is also provided forming substantially a loop connecting the ducts 36 and 37. A check valve 39 is arranged on one side of the pump and controlling the passage of fluid through the pump. A valve 40 is also provided. The plug 39' permits the positioning of valve 39. If it is desired to place a valve in the duct 36 similar to the valve 39, the same may be easily constructed. It is not considered necessary to illustrate the changing of the valve from the arrangement shown to the duct 37 as this will be obvious.

In the operation of the device, assuming that the body is down in position as shown in Fig. 1, and the pump is driven forcing fluid in the system through the pump. Valve 40 (Fig. 6) is closed and fluid passes from pipe 33 through the pump and through pipe 32, duct 28, into the casing below the plunger, causing the plunger to rise. Any oil or fluid above the plunger of course flows through pipe 30 and duct 29 into pipe 33 and through the pump. As the plunger rises, the plunger rod 7 is obviously raised, carrying with it the cross head 15 and sheave 16, and the ends 20 being secured to the base, the front end of the body is lifted or tilted by means of the ends 19 secured to the body. However, the point 22 being forward of the trunnions 8 and the trunnions 8 being back of the center line of the hoist, the weight carried by the plunger rod tends to maintain the casing rigidly on its stop 12 and in vertical position. As the body is raised, however, and pivots about the center 4, the point 22 moves rearwardly as well as upwardly. Until, however, the point 22 crosses the line drawn between the edge of the sheaves 16 and the axis of the trunnions 8, the hoist casing will maintain its vertical position. As soon, however, as the points 22 pass the lines mentioned (for example see Fig. 3, point 22 at $x$ and $y$) the hoist casing is slowly tilted on its trunnions substantially as shown in the dotted lines in Fig. 2. In the full lines in Fig. 2 the body has just passed the point at which the casing begins to tilt. It will be noted by referring to Figs. 2 and 3 that owing to the tilting there is substantially no transverse strain on the plunger rod 7, but that the pull is substantially in a line with the rod on each side.

With this construction no connections are necessary between the body and upper part of the casing or plunger rod to tilt the same. Obviously, the time at which the hoist will begin to tilt will depend on the location of the pivotal axis of the casing, as well as the position of the point 22 and point 4, also the variation of the sizes of them. Varying these points will vary the action. As soon as the load has been dumped, valve 40 is opened and the fluid or oil flows back through pipe 32, through duct 38 and pipe 33. If the pump is driven at the same time, and this is immaterial, any fluid pumped by the pump will also pass into duct 38 into pipe 33. The fluid is free to pass into duct 36, past the valve 39, but cannot flow through the pump in a reverse direction. Obviously, the descent of the body may be stopped at any point by closing the valve 40, and if the pump is stopped and valve 40 closed, the body may be held in any tilted position. If the body is down and the pump left running, valve 40 being open, the fluid may circulate through the pump continuously, without tilting the body. If desired pipe 33 may be connected to a storage tank in place of to the casing, which acts as a storage tank above the plunger.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:—

1. A hoisting mechanism of the kind described comprising a suitable casing, a base therefor, means for pivotally securing said casing to said base at one side of the longitudinal axis of the casing, a plunger arranged on said casing, a plunger rod carried thereby projecting from the upper end of the casing, sheaves mounted for a rotary movement on said plunger rod and cables carried by said sheaves.

2. In a device of the kind described and in combination, a frame, a body pivotally secured thereon and means for lifting the body at one end comprising a casing pivotally mounted on the frame at a point substantially between the center axis of the casing and the body, a plunger rod projecting from said casing, sheaves carried on the upper end of said rod, cables extended through said sheaves, said cables each having one end at one side of the sheaves suitably anchored, and means for securing the other ends of said cables to the body beyond the pivotal connection of the casing on the frame.

In testimony whereof I have hereunto signed my name in the presence of two subscribing witnesses.

IRVING F. AVERY.

Witnesses:
 Roy W. Hill,
 Charles I. Cobb.